(12) United States Patent
Ichinoe et al.

(10) Patent No.: US 10,230,285 B2
(45) Date of Patent: Mar. 12, 2019

(54) ROTATING ELECTRIC MACHINE

(71) Applicant: HONDA MOTOR CO., LTD., Tokyo (JP)

(72) Inventors: Yuki Ichinoe, Wako (JP); Tomotaka Iki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 15/360,999

(22) Filed: Nov. 24, 2016

(65) Prior Publication Data
US 2017/0149307 A1 May 25, 2017

(30) Foreign Application Priority Data

Nov. 24, 2015 (JP) ................................. 2015-228654

(51) Int. Cl.
| | | |
|---|---|---|
| *H02K 9/00* | (2006.01) | |
| *H02K 1/16* | (2006.01) | |
| *H02K 1/20* | (2006.01) | |
| *H02K 3/24* | (2006.01) | |
| *H02K 9/19* | (2006.01) | |
| *H02K 9/193* | (2006.01) | |
| *H02K 9/197* | (2006.01) | |
| *H02K 9/20* | (2006.01) | |

(52) U.S. Cl.
CPC ............... *H02K 9/005* (2013.01); *H02K 1/16* (2013.01); *H02K 1/20* (2013.01); *H02K 3/24* (2013.01); *H02K 9/19* (2013.01); *H02K 9/193* (2013.01); *H02K 9/197* (2013.01); *H02K 9/20* (2013.01)

(58) Field of Classification Search
CPC .. H02K 1/16; H02K 1/20; H02K 3/24; H02K 9/005; H02K 9/19; H02K 9/193; H02K 9/197; H02K 9/20
USPC .................................. 310/54, 52, 58, 59, 260
See application file for complete search history.

(56) References Cited

U.S. PATENT DOCUMENTS

| | | | | |
|---|---|---|---|---|
| 6,400,059 B1 * | 6/2002 | Hsu | ........................ | H02K 1/148 310/254.1 |
| 6,700,282 B2 * | 3/2004 | Mori | ................... | H02K 15/0056 310/201 |
| 6,958,561 B2 * | 10/2005 | Liao | ........................ | H02K 3/12 29/596 |

(Continued)

FOREIGN PATENT DOCUMENTS

JP          2010-166710          7/2010

*Primary Examiner* — Nguyen Tran
*Assistant Examiner* — Demetries A Gibson
(74) *Attorney, Agent, or Firm* — Mori & Ward, LLP

(57) ABSTRACT

A rotating electric machine includes a ring-shaped cover. The ring-shaped cover includes an outer peripheral portion, an inner peripheral portion, wall portions, an outer peripheral channel, an inner peripheral channel, and radial channels. A coolant supplied into the ring-shaped cover is to flow through the outer peripheral channel by gravity. The coolant is to flow through the inner peripheral channel by gravity. The radical channels include a first radial channel and a second radial channel. The coolant is to flow from the outer peripheral channel to the inner peripheral channel by gravity through the first radial channel. The coolant is to flow from the inner peripheral channel to the outer peripheral channel by gravity through the second radial channel. The coolant is to flow from the second radical channel by gravity through the outer peripheral channel.

5 Claims, 9 Drawing Sheets

(56) References Cited

U.S. PATENT DOCUMENTS

| | | | | |
|---|---|---|---|---|
| 9,793,773 B2* | 10/2017 | Iki | ............ | H02K 3/28 |
| 2011/0285224 A1* | 11/2011 | Iki | ............ | H02K 3/24 |
| | | | | 310/64 |
| 2011/0316367 A1* | 12/2011 | Takahashi | ............ | H02K 3/24 |
| | | | | 310/54 |
| 2013/0020890 A1* | 1/2013 | Iki | ............ | H02K 3/12 |
| | | | | 310/71 |
| 2013/0020891 A1* | 1/2013 | Kishi | ............ | H02K 3/12 |
| | | | | 310/71 |
| 2013/0020901 A1* | 1/2013 | Kishi | ............ | H02K 3/12 |
| | | | | 310/215 |
| 2014/0319960 A1* | 10/2014 | Iki | ............ | H02K 3/28 |
| | | | | 310/216.115 |
| 2016/0118869 A1* | 4/2016 | Nakano | ............ | H02K 15/105 |
| | | | | 29/596 |
| 2016/0190891 A1* | 6/2016 | Masugi | ............ | H02K 15/12 |
| | | | | 310/201 |
| 2017/0133891 A1* | 5/2017 | Klassen | ............ | H02K 1/20 |

* cited by examiner

ROTATING ELECTRIC MACHINE

CROSS-REFERENCE TO RELATED APPLICATIONS

The present application claims priority under 35 U.S.C. § 119 to Japanese Patent Application No. 2015-228654, filed Nov. 24, 2015, entitled "Rotating Electric Machine." The contents of this application are incorporated herein by reference in their entirety.

BACKGROUND

1. Field

The present disclosure relates to a rotating electric machine.

2. Description of the Related Art

In general, in rotating electric machines, slots are formed in a stator so as to be arranged in an annular shape, slot coils are inserted into the slots, and coil end portions protrude from an end of the stator in the axial direction.

Various technologies have been developed in order to cool the coil end portions. For example, Japanese Unexamined Patent Application Publication No. 2010-166710 describes a stator for cooling the entirety of coil end portions substantially uniformly and for improving the cooling efficiency by increasing the flow velocity of a coolant when the flow rate of the coolant is increased.

SUMMARY

According to one aspect of the present invention, a rotating electric machine includes a slot coil, a plurality of radial coils, and a ring-shaped cover member. The slot coil is inserted into a slot formed in a stator. The plurality of radial coils is connected to the slot coil at a plurality of coil end portions that are arranged in an annular shape, each of the radial coils extending in a radial direction. The ring-shaped cover member covers at least a part of each of the coil end portions, that accommodates the radial coils, and that is attached to the stator. The cover member includes an outer peripheral portion, an inner peripheral portion, and wall portions. The outer peripheral portion surrounds outer peripheries of the coil end portions. The inner peripheral portion is surrounded by inner peripheries of the coil end portions. The wall portions extend along the radial coils in the radial direction and that protrude further than the radial coils in an axial direction. A coil cooling channel is formed in the cover member and includes an upper-side outer peripheral channel, a first radial channel, an inner peripheral channel, a second radial channel, and a lower-side outer peripheral channel. A coolant that is supplied from an upper part of the outer peripheral portion flows along the outer peripheral portion by gravity through the upper-side outer peripheral channel. The coolant flows from the upper-side outer peripheral channel along spaces between the wall portions and the radial coils by gravity through the first radial channel. The coolant flows from the first radial channel along the inner peripheral portion by gravity through the inner peripheral channel. The coolant flows from the inner peripheral channel along spaces between the wall portions and the radial coils by gravity through the second radial channel. The coolant is discharged from the second radial channel along the outer peripheral portion by gravity through the lower-side outer peripheral channel.

According to another aspect of the present invention, a rotating electric machine includes a stator, slot coils, radial coils, and a ring-shaped cover. The stator has slots extending along a rotational axis of the rotating electric machine. The slot coils are provided in each of the slots, respectively. The slot coils have coil end portions which are arranged in an annular shape viewed along the rotational axis. Each of the radial coils extends in a radial direction of the annular shape and is connected to each of the coil end portions. The ring-shaped cover accommodates the radial coils and is attached to the stator so as to cover at least a part of each of the coil end portions. The ring-shaped cover includes an outer peripheral portion, an inner peripheral portion, wall portions, an outer peripheral channel, an inner peripheral channel, and radial channels. The outer peripheral portion surrounds the coil end portions around the rotational axis. The inner peripheral portion is surrounded by the coil end portions around the rotational axis. Each of the wall portions extends along the radial coils and is provided between the outer peripheral portion and the inner peripheral portion viewed along the rotational axis. The outer peripheral channel extends along the outer peripheral portion such that a coolant supplied into the ring-shaped cover is to flow through the outer peripheral channel by gravity. The inner peripheral channel extends along the inner peripheral portion and is surrounded by the outer peripheral channel viewed along the rotational axis such that the coolant is to flow through the inner peripheral channel by gravity. Each or the radial channels is defined between each of the wall portions and each of the radial coils and connects the outer peripheral channel to the inner peripheral channel. The radical channels include a first radial channel and a second radial channel. The coolant is to flow from the outer peripheral channel to the inner peripheral channel by gravity through the first radial channel. The coolant is to flow from the inner peripheral channel to the outer peripheral channel by gravity through the second radial channel. The coolant is to flow from the second radical channel by gravity through the outer peripheral channel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
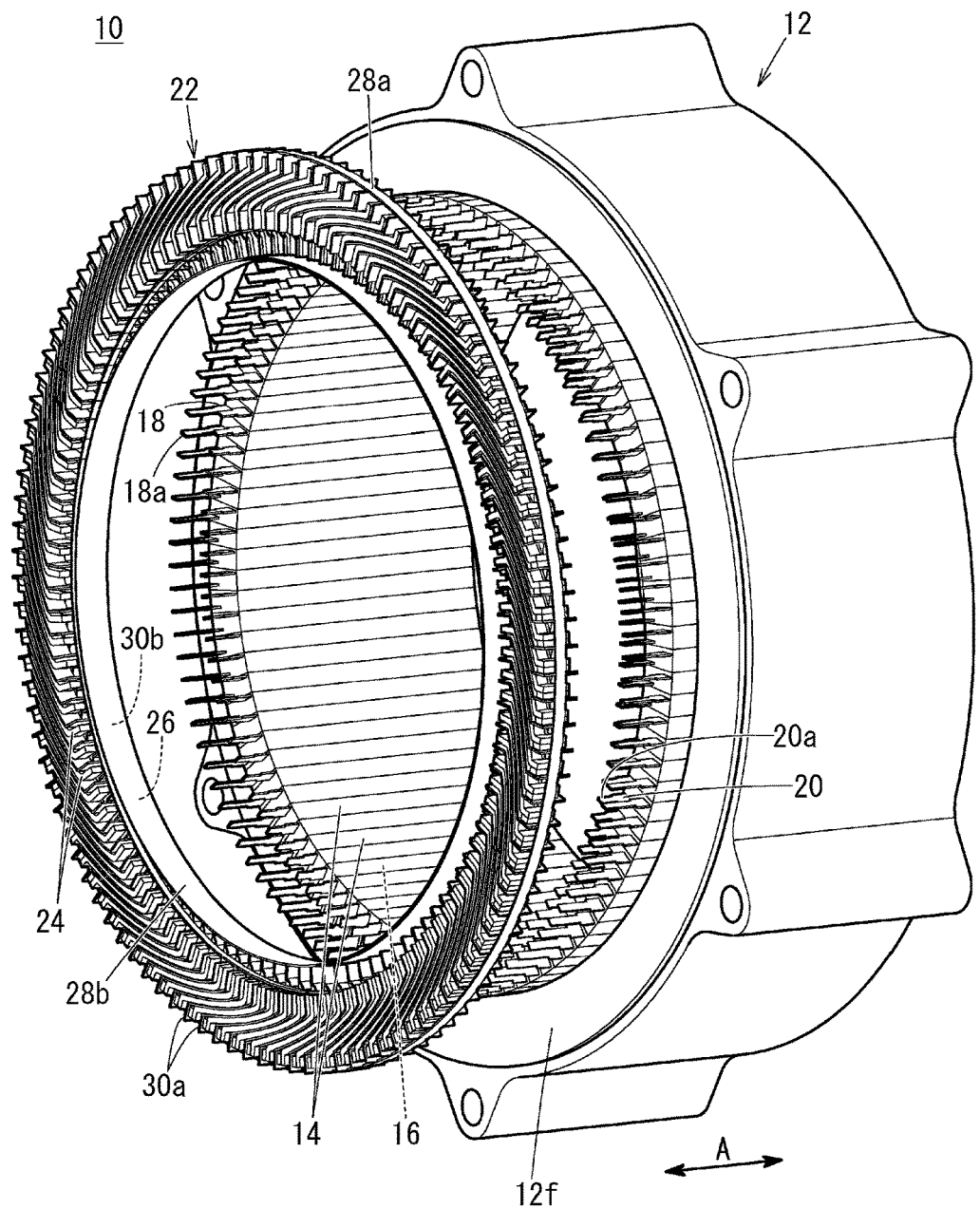
FIG. 1 is a partially exploded perspective view of a rotating electric machine according to an embodiment of the present disclosure.

The embodiments will now be described with reference to the accompanying drawings, wherein like reference numerals designate corresponding or identical elements throughout the various drawings.

Referring to FIG. 1, a rotating electric machine 10 according to an embodiment of the present disclosure includes a stator 12, which has an annular shape, and a rotor (not shown), which is disposed in the stator 12. A plurality of teeth 14 are arranged along the inner periphery of the stator 12 in the radial direction. A plurality of slots 16 are formed between adjacent teeth 14. The slots 16 are arranged in an annular shape in the stator 12.

The slots 16 extend through the stator 12 in the axial direction (direction of arrow A). An outer slot coil 18 and an inner slot coil 20, which are insulated from each other, are disposed in each of the slots 16 so as to extend in the axial direction.

The outer slot coils 18 are arranged in an annular shape. Each of the outer slot coils 18 has an outer coil end portion 18a at an end thereof. The outer coil end portion 18a has a small width and protrudes from a ring-shaped end surface 12f of the stator 12 in the axial direction. The inner slot coils 20 are arranged in an annular shape so as to be located inside of and coaxial with the annular shape of the outer slot coils 18. Each of the inner slot coils 20 has an inner coil end portion 20a at an end thereof. The inner coil end portion 20a has a small width and protrudes from the end surface 12f of the stator 12 in the axial direction. The length of the outer coil end portion 18a and the length of the inner coil end portion 20a in the axial direction are set so that the outer coil end portion 18a protrudes further than the inner coil end portion 20a outward in the axial direction.

Figure 2:
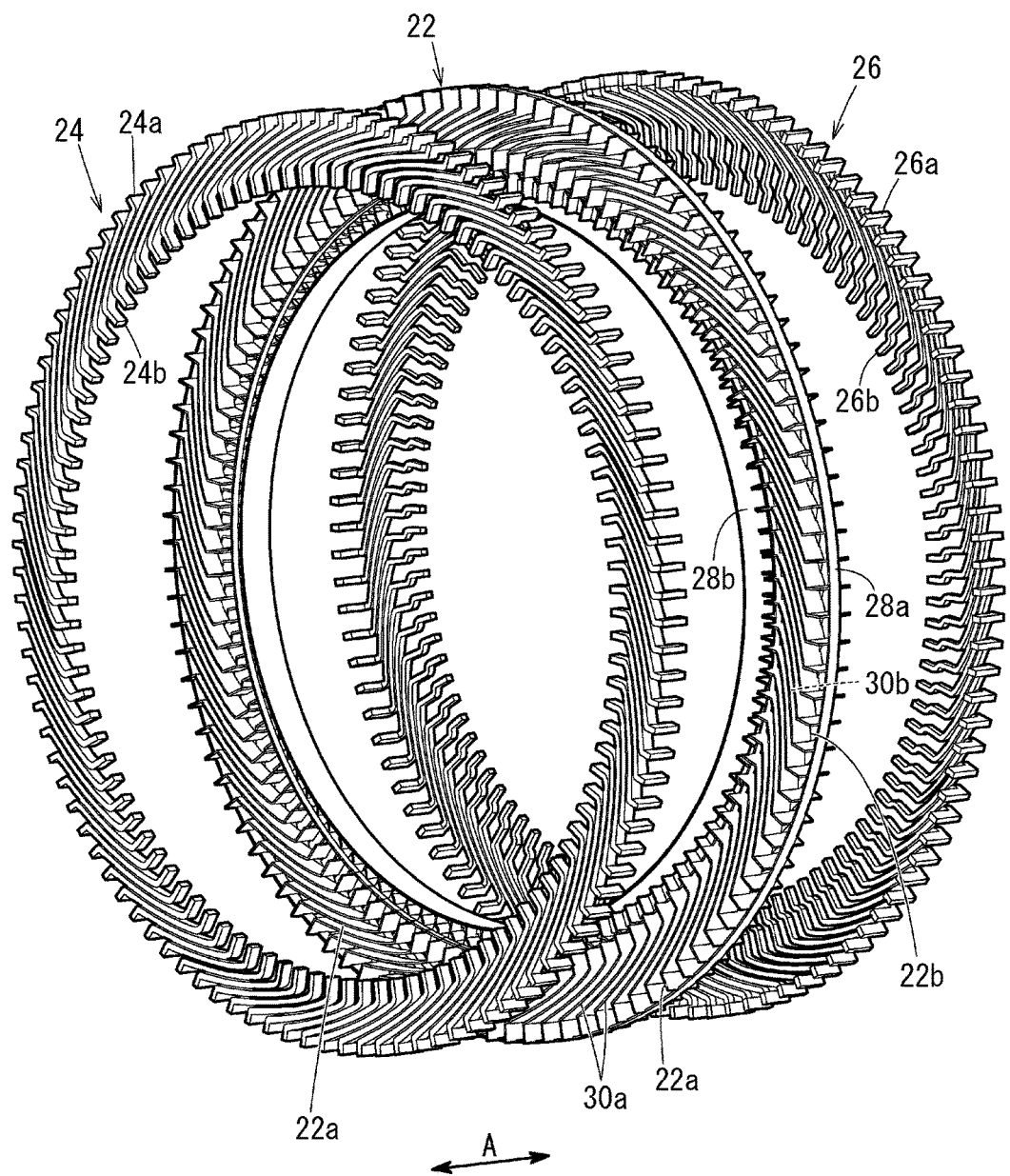
FIG. 2 is an exploded perspective view of a cover member and radial coils of the rotating electric machine.

A cover member 22, having a ring shape, is disposed on the stator 12 so as to cover at least a part of each of the outer coil end portions 18a and the inner coil end portions 20a. Referring to FIG. 2, the cover member 22 accommodates a plurality of outer radial coils 24 on a surface 22a side and accommodates a plurality of inner radial coils 26 on a surface 22b side (facing the stator 12).

The cover member 22 is made of an electrically insulating nonmagnetic material, such as a resin. The cover member 22 has substantially the same shape as the end surface 12f of the stator 12. The cover member 22 includes an outer peripheral portion 28a, which surrounds the outer peripheries of the outer coil end portions 18a and the inner coil end portions 20a. The cover member 22 includes an inner peripheral portion 28b, which is surrounded by the inner peripheries of the outer coil end portions 18a and the inner coil end portions 20a. The outer peripheral portion 28a and the inner peripheral portion 28b are ring-shaped plates that each have a comparatively large width in the axial direction and a small thickness in the radial direction. The width of the inner peripheral portion 28b is larger than the width of the outer peripheral portion 28a.

Figure 3:
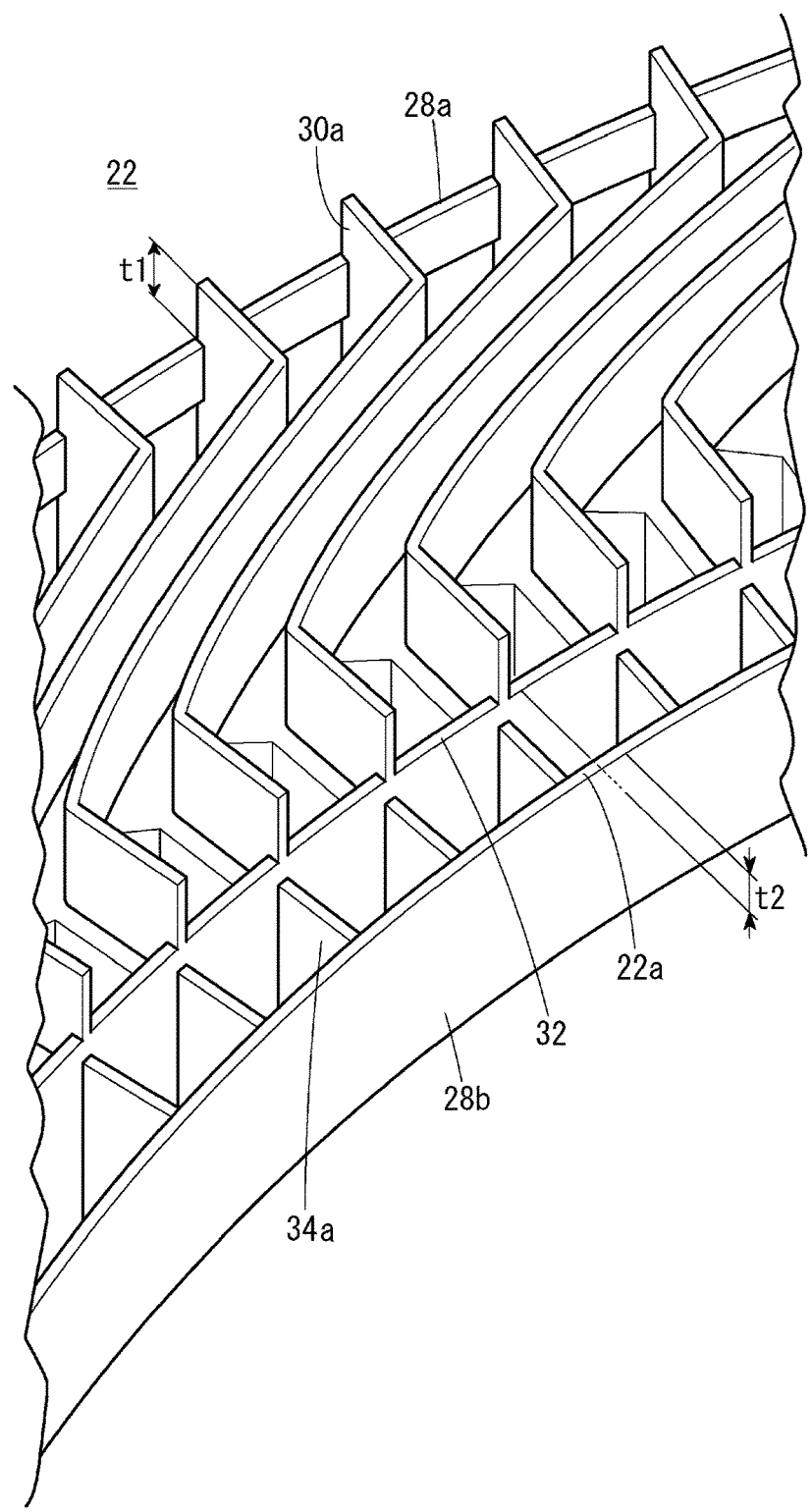
FIG. 3 is a partial perspective view showing one side of the cover member.
Figure 4:
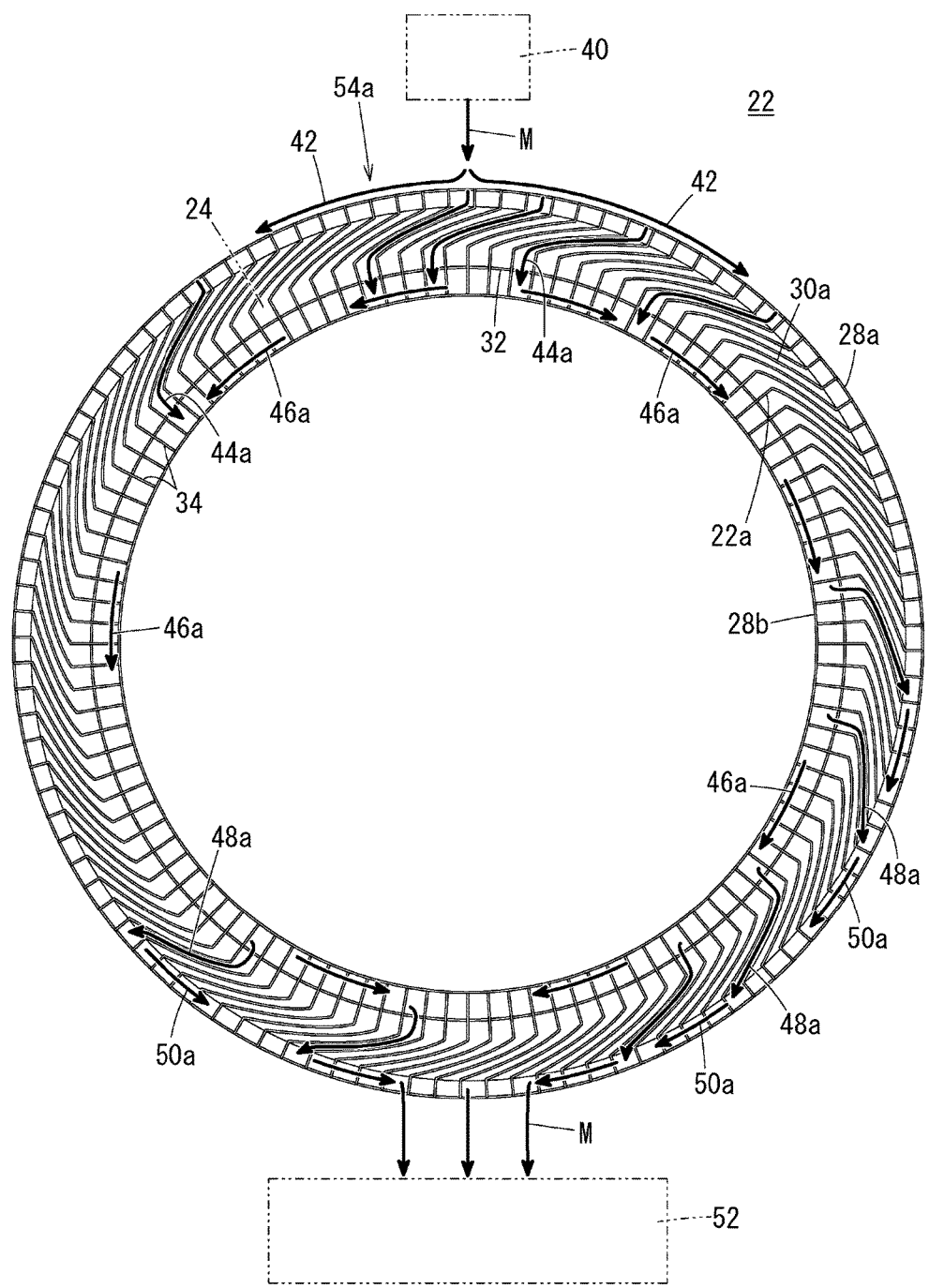
FIG. 4 is a plan view showing the one side of the cover member.

Referring to FIGS. 2 to 4, a plurality of outer wall portions 30a are integrally formed with the outer peripheral portion 28a of the cover member 22 so as to protrude from the surface 22a and so as to be arranged at regular angular intervals. Referring to FIG. 3, each of the outer wall portions 30a protrudes outward in the axial direction from an end surface of the outer peripheral portion 28a by a length t1. In plan view, each of the outer wall portions 30a extends inward in the radial direction along an involute shape and is integrated with an inner ring portion 32.

The inner ring portion 32 has a large width in the axial direction and a small thickness in the radial direction. The position of an end of the inner ring portion 32 is separated inward (toward the surface 22b) from the position of an end of the inner peripheral portion 28b by a length t2. A plurality of support plate portions 34a are fixed to a bottom surface of the inner ring portion 32 and an upper surface of the inner peripheral portion 28b. The support plate portions 34a are disposed at positions that are continuous with the positions of the lower ends of the outer wall portions 30a. The support plate portions 34a are separated inward from the end of the inner peripheral portion 28b.

Figure 5:
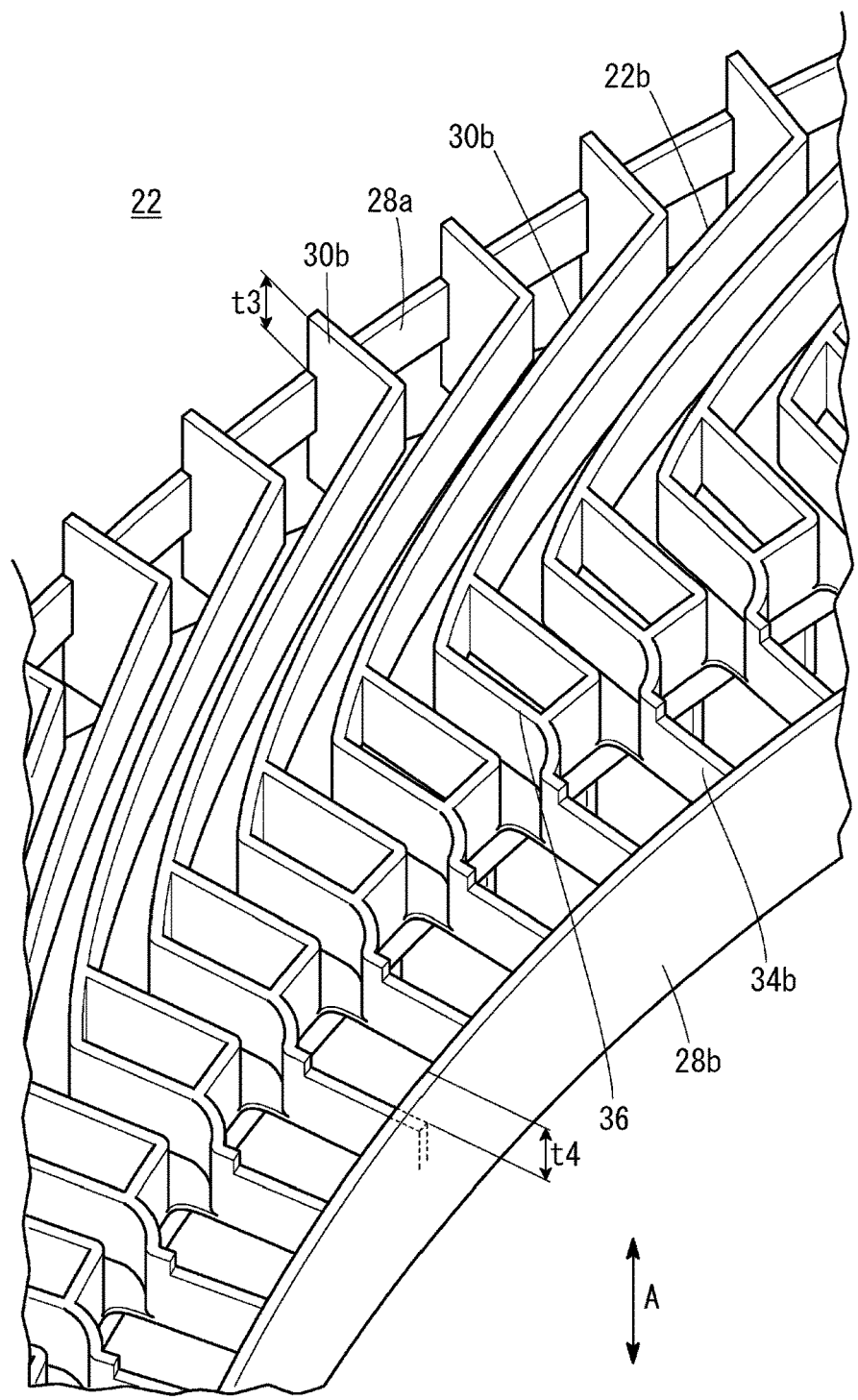
FIG. 5 is a partial perspective view showing the other side of the cover member.
Figure 6:
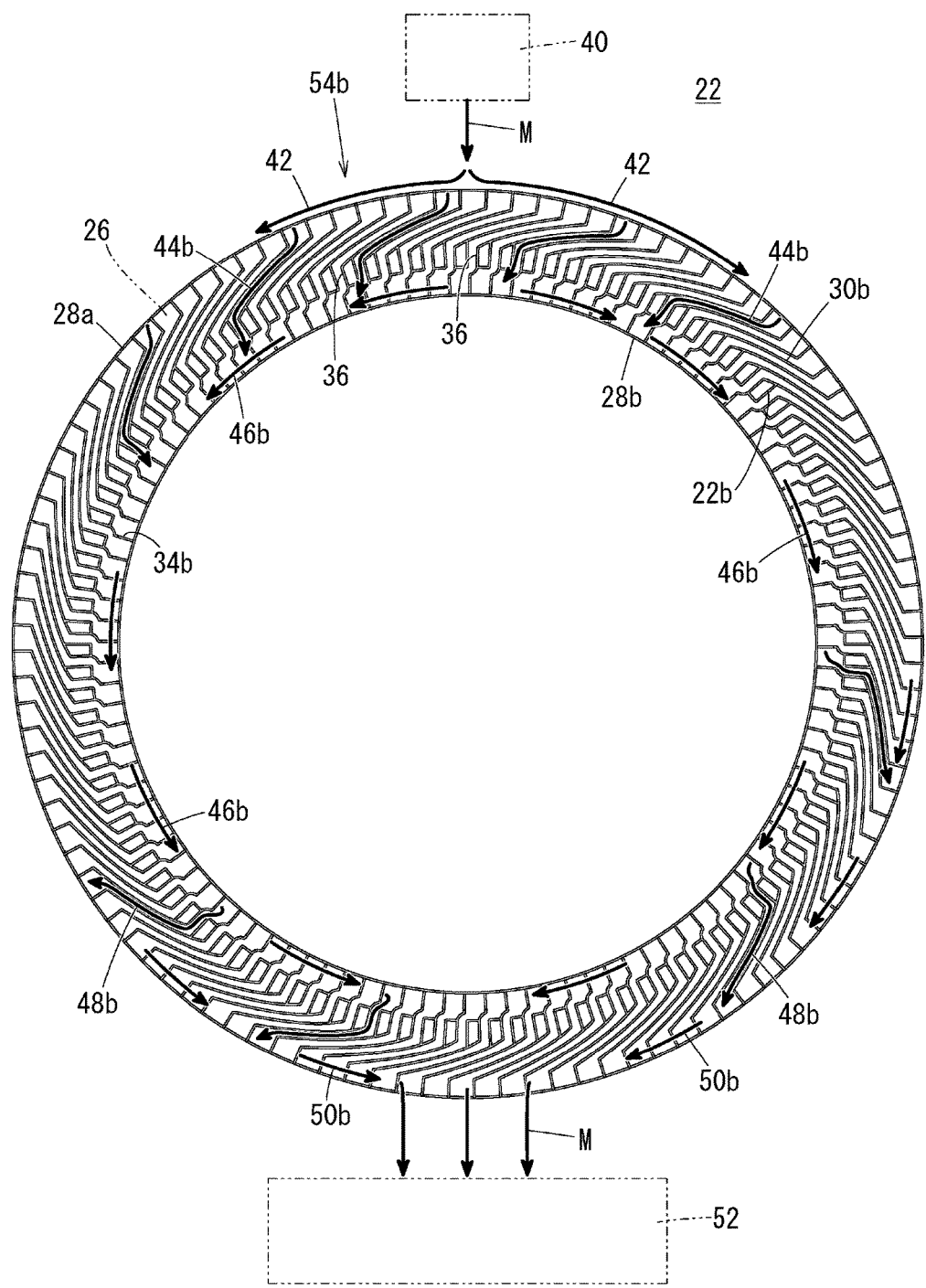
FIG. 6 is a plan view showing the other side of the cover member.

Referring to FIGS. 5 and 6, a plurality of outer wall portions 30b are integrally formed with the outer peripheral portion 28a of the cover member 22 so as to protrude from the surface 22b and so as to be arranged at regular angular intervals. Referring to FIG. 5, each of the outer wall portions 30b protrudes outward in the axial direction from an end surface of the outer peripheral portion 28a by a length t3. In plan view, each of the outer wall portions 30b extends inward in the radial direction along an involute shape and is integrated with a corresponding one of rectangular portions 36. The outer wall portions 30a and the outer wall portions 30b are inclined in different directions in plan view. The sum of the lengths of the outer wall portion 30a, the outer wall portion 30b, and the outer peripheral portion 28a in the axial direction is substantially the same as the length of the inner peripheral portion 28b in the axial direction.

The rectangular portions 36 each have a rectangular shape that is elongated in the radial direction. A plurality of support plate portions 34b are fixed to bottom surfaces of the rectangular portions 36 and to the upper surface of the inner peripheral portion 28b. Each of the support plate portions 34b is separated inward (toward the surface 22a) from the position of an end of the inner peripheral portion 28b by a length t4.

Figure 7:
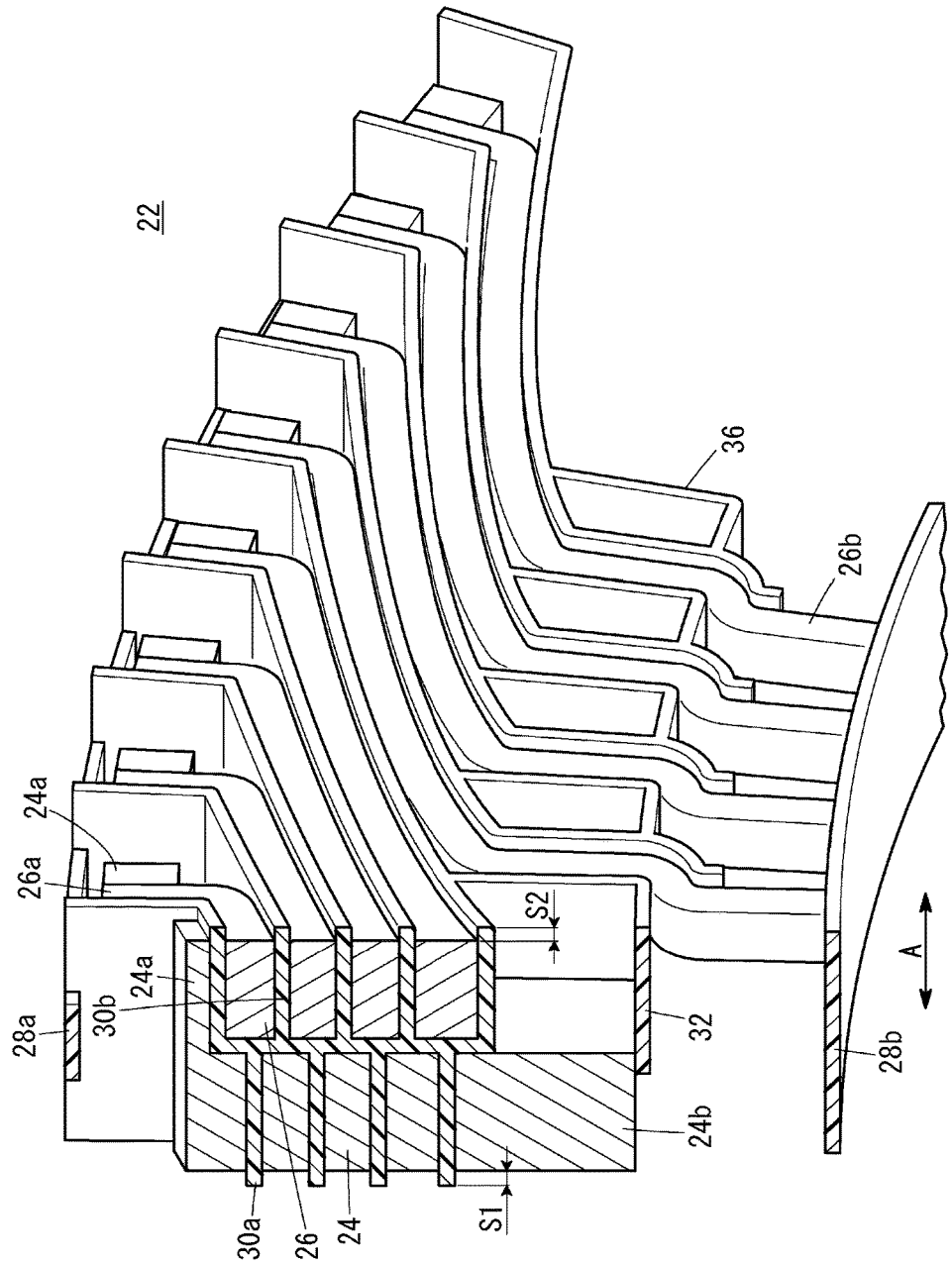
FIG. 7 is a partial sectional view of the cover member and the radial coils.

Referring to FIG. 2, each of the outer radial coils 24 has a substantially rectangular cross-sectional shape and is made of an electroconductive material, such as copper. The outer radial coil 24 has an involute shape in plan view and is disposed between adjacent outer wall portions 30a of the cover member 22. Referring to FIG. 7, each of the outer wall portions 30a protrudes further than the outer radial coil 24 in the axial direction by a length S1. The outer radial coil 24 includes a joint portion 24a at an upper end thereof. The joint portion 24a is disposed close to the outer peripheral portion 28a and extends in the axial direction. The outer radial coil 24 includes a connection portion 24b at a lower end thereof. The connection portion 24b extends to a lower end of the inner ring portion 32. The connection portion 24b is electrically connected to the outer coil end portion 18a of the outer slot coil 18. The outer coil end portion 18a is inserted through the rectangular portion 36 to be connected to the connection portion 24b.

Referring to FIG. 2, each of the inner radial coils 26 has a substantially rectangular cross-sectional shape and is made of an electroconductive material, such as copper. The inner radial coil 26 has an involute shape in plan view and is disposed between adjacent outer wall portions 30b of the cover member 22. Referring to FIG. 7, each of the outer wall portions 30b protrudes further than the inner radial coil 26 in the axial direction by a length S2. The inner radial coil 26 includes a joint portion 26a at an upper end thereof. The joint portion 26a is disposed close to the outer peripheral portion 28a so as to extend in the axial direction. The inner radial coil 26 includes a connection portion 26b at a lower end thereof. The connection portion 26b extends to the inner peripheral portion 28b.

The connection portions 26b is electrically connected to the inner coil end portion 20a of the inner slot coils 20. The joint portion 24a and the joint portion 26a are electrically connected to each other, so that the outer radial coil 24 and the inner radial coil 26 are electrically connected to each other.

Referring to FIG. 4, a coolant supply unit 40 is disposed above the cover member 22. A coolant M is supplied from the coolant supply unit 40 to an upper part of the cover member 22. An upper-side outer peripheral channel 42 is formed on the upper part of the outer peripheral portion 28a of the cover member 22. The coolant M, which is supplied from the coolant supply unit 40, flows through the upper-side outer peripheral channel 42 along the peripheral surface by gravity.

A first outer radial channel 44a is formed in an upper part of the cover member 22 on the surface 22a side. The coolant M flows from the upper-side outer peripheral channel 42 through the first outer radial channel 44a along spaces between the outer wall portions 30a and the outer radial coils 24 by gravity. An outside inner peripheral channel 46a is formed in an upper part of the cover member 22. The coolant M flows from the first outer radial channel 44a through the outside inner peripheral channel 46a along the inner peripheral portion 28b by gravity.

A second outer radial channel 48a is formed in a lower part of the cover member 22. The coolant M flows from the outside inner peripheral channel 46a through the second outer radial channel 48a along spaces between the outer wall portions 30a and the outer radial coils 24 by gravity. A lower-side outer peripheral channel 50a is formed in a lower part of the cover member 22. The coolant M is discharged from the second outer radial channel 48a through the lower-side outer peripheral channel 50a along the outer peripheral portion 28a by gravity. As necessary, a coolant discharge unit 52 is disposed below the lower-side outer peripheral channel 50a.

An outer coil cooling channel 54a, including the upper-side outer peripheral channel 42, the first outer radial channel 44a, the outside inner peripheral channel 46a, the second outer radial channel 48a, and the lower-side outer peripheral channel 50a, is formed on the surface 22a side of the cover member 22.

Referring to FIG. 6, a first inner radial channel 44b is formed in an upper part of the cover member 22 on the surface 22b side. The coolant M flows from the upper-side outer peripheral channel 42 through the first inner radial channel 44b along spaces between the outer wall portions 30b and the inner radial coils 26 by gravity. An inside inner peripheral channel 46b is formed in an upper part of the cover member 22. The coolant M flows from the first inner radial channel 44b through the inside inner peripheral channel 46b along the inner peripheral portion 28b by gravity.

A second inner radial channel 48b is formed in a lower part of the cover member 22. The coolant M flows from the inside inner peripheral channel 46b through The second inner radial channel 48b along spaces between the outer wall portions 30b and the inner radial coils 26 by gravity. A lower-side outer peripheral channel 50b is formed in a lower part of the cover member 22. The coolant M is discharged from the second inner radial channel 48b through the lower-side outer peripheral channel 50b along the outer peripheral portion 28a by gravity. As necessary, the coolant discharge unit 52 is disposed below the lower-side outer peripheral channel 50b.

An inner coil cooling channel 54b, including the upper-side outer peripheral channel 42, the first inner radial channel 44b, the inside inner peripheral channel 46b, the second inner radial channel 48b, and the lower-side outer peripheral channel 50b, is formed on the surface 22b side of the cover member 22.

An operation of the rotating electric machine 10, which has the structure described above, will be described.

Figure 8:
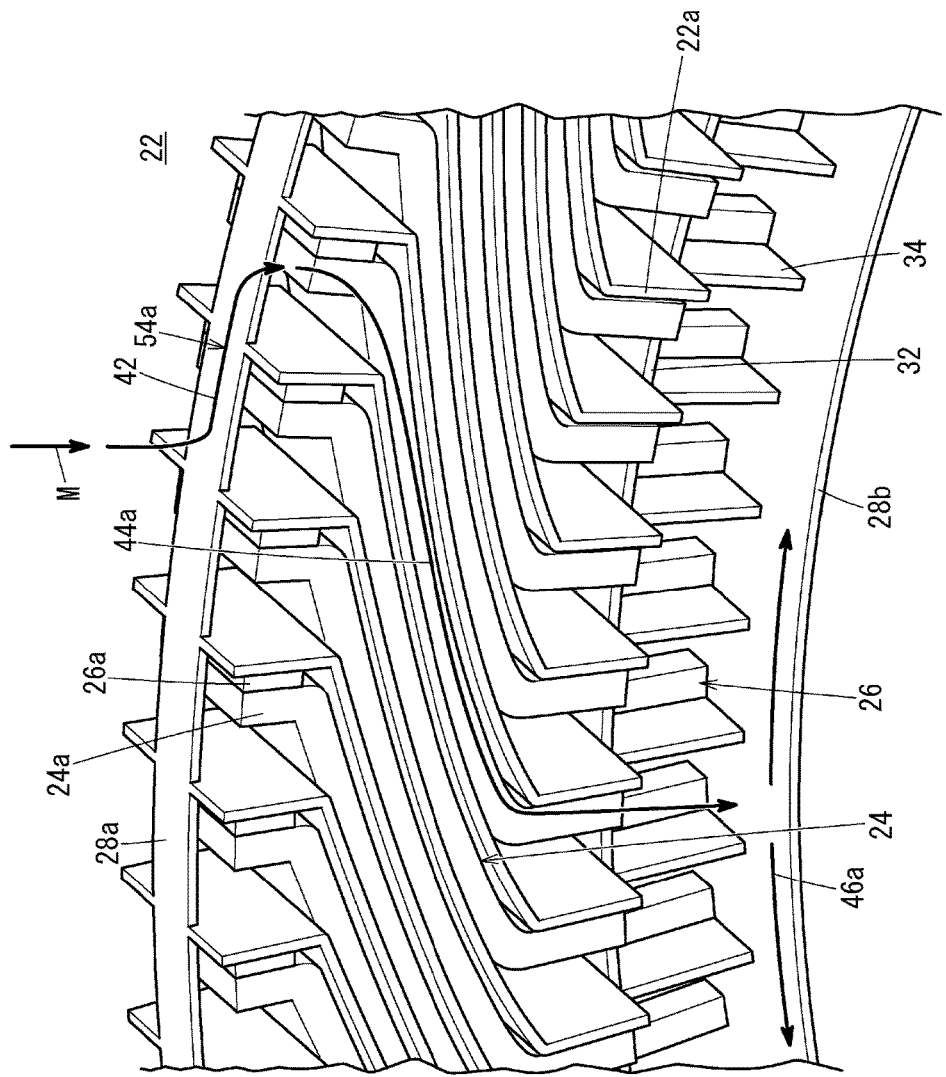
FIG. 8 illustrates an upper part of the cover member and a flow of a coolant.

Referring to FIG. 4, when the coolant supply unit 40 supplies the coolant M to an upper part of the cover member 22, the coolant M flows along the upper-side outer peripheral channel 42 by gravity. Referring to FIGS. 4 and 8, the coolant M flows from the upper-side outer peripheral channel 42 along the first outer radial channel 44a, which is formed between the outer wall portions 30a and the outer radial coils 24, by gravity.

Figure 9:
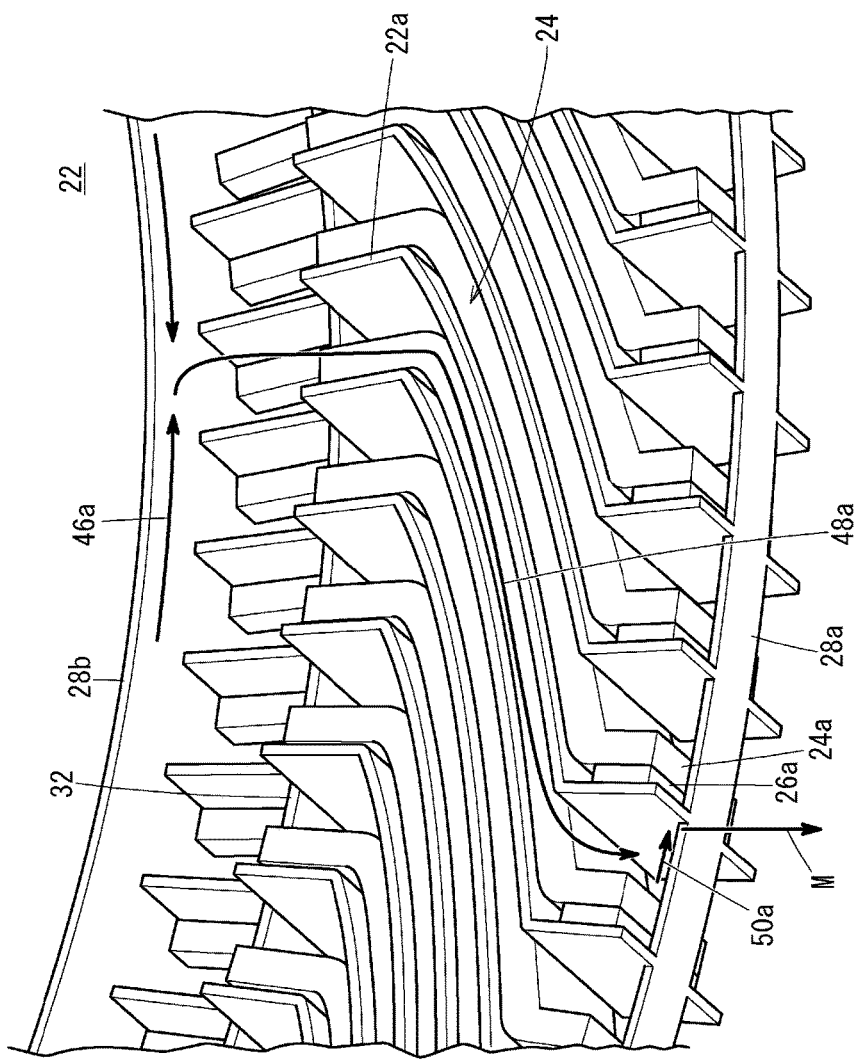
FIG. 9 illustrates a lower part of the cover member and a flow of the coolant.

The coolant M flows from the first outer radial channel 44a along the outside inner peripheral channel 46a of the inner peripheral portion 28b by gravity. Referring to FIGS. 4 and 9, after flowing to a lower part of the cover member 22, the coolant M flows from the outside inner peripheral channel 46a along the second outer radial channel 48a by gravity. Then, the coolant M flows from the second outer radial channel 48a along the lower-side outer peripheral channel 50a by gravity and is discharged to the coolant discharge unit 52 (see FIG. 4).

In the present embodiment, the coolant M can flow from the upper part toward the lower part of the cover member 22 along the outer coil cooling channel 54a by gravity. Accordingly, the coolant M can smoothly and reliably flow from upper parts toward lower parts of the outer coil end portion 18a, the inner coil end portion 20a, and the outer radial coil 24.

Thus, the outer coil end portions 18a, the inner coil end portions 20a, and the outer radial coils 24 can be uniformly cooled by using only gravity acting on the coolant M. Therefore, it is not necessary to use a pump that has high discharge capacity and that is comparatively expensive. Accordingly, the entirety of the rotating electric machine 10 can have an economical and compact structure.

Referring to FIG. 6, when the coolant supply unit 40 supplies the coolant M to an upper part of the cover member 22, the coolant M flows along the upper-side outer peripheral channel 42. The coolant M flows from the upper-side outer peripheral channel 42 along the first inner radial channel 44b, which is formed between the outer wall portions 30b and the inner radial coils 26, by gravity.

The coolant M flows from the first inner radial channel 44b along the inside inner peripheral channel 46b of the inner peripheral portion 28b by gravity. After flowing to a lower part of the cover member 22, the coolant M flows from the inside inner peripheral channel 46b along the second inner radial channel 48b by gravity. Then, the coolant M flows from the second inner radial channel 48b along the lower-side outer peripheral channel 50b by gravity and is discharged to the coolant discharge unit 52 (see FIG. 6).

Thus, the coolant M can flow from the upper part toward the lower part of the cover member 22 along the inner coil cooling channel 54b by gravity. Therefore, the coolant M can flow from upper parts toward lower parts of the outer coil end portion 18a, the inner coil end portion 20a, and the inner radial coil 26. Accordingly, the outer coil end portion 18a, the inner coil end portion 20a, and the inner radial coil 26 can be uniformly cooled by using only gravity acting on the coolant M. As a result, the entirety of the rotating electric machine 10 can have an economical and compact structure.

In the present embodiment, the rotating electric machine 10 includes the outer coil cooling channel 54a and the inner coil cooling channel 54b. However, this is not a limitation. A rotating electric machine according to the present disclosure may include three or more coil cooling channels.

According to the present disclosure, a rotating electric machine includes a slot coil, a plurality of radial coils, and a ring-shaped cover member. The slot coil is inserted into a slot formed in a stator. The radial coils are connected to the slot coil at a plurality of coil end portions that are arranged in an annular shape, and each of the radial coils extends in a radial direction. The ring-shaped cover member covers at least a part of each of the coil end portions, accommodates the radial coils, and is attached to the stator.

The cover member includes an outer peripheral portion that surrounds outer peripheries of the coil end portions, an inner peripheral portion that is surrounded by inner peripheries of the coil end portions, and wall portions that extend along the radial coils in the radial direction and that protrude further than the radial coils in an axial direction.

A coil cooling channel is formed in the cover member. The coil cooling channel includes an upper-side outer peripheral channel, a first radial channel, an inner peripheral channel, a second radial channel, and a lower-side outer peripheral channel. A coolant that is supplied from an upper part of the outer peripheral portion flows through the upper-side outer peripheral channel along the outer peripheral portion by gravity. The coolant flows from the upper-side outer peripheral channel through the first radial channel along spaces between the wall portions and the radial coils by gravity.

The coolant flows from the first radial channel through the inner peripheral channel along the inner peripheral portion by gravity. The coolant flows from the inner peripheral channel through the second radial channel along spaces between the wall portions and the radial coils by gravity. The coolant is discharged from the second radial channel through the lower-side outer peripheral channel along the outer peripheral portion by gravity.

In the rotating electric machine, preferably, the coil cooling channel is formed at least on each of one side of the cover member facing the stator and the other side of the cover member facing away from the stator.

With the present disclosure, a coolant that is supplied to an upper part of the outer peripheral portion of the cover member flows along the upper-side outer peripheral channel by gravity, and the coolant flows from the upper-side outer peripheral channel along the first radial channel, which is formed between the wall portions and the radial coils, by gravity. After flowing from the first radial channel through the inner peripheral channel along the inner peripheral portion by gravity, the coolant flows from the inner peripheral channel along the second radial channel, which is formed between the wall portion and the radial coil, by gravity. Then, the coolant is discharged from the second radial channel along the lower-side outer peripheral channel by gravity.

Therefore, the coolant can flow from upper parts to lower parts of the coil end portions and the radial coils by only flowing downward by gravity. Accordingly, the coil end portions and the radial coils can be uniformly cooled by using only gravity acting on the coolant, and therefore the entirety of the rotating electric machine can have an economical and compact structure.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electric machine comprising:
a slot coil that is inserted into a slot formed in a stator;
a plurality of radial coils that are connected to the slot coil at a plurality of coil end portions that are arranged in an annular shape, each of the radial coils extending in a radial direction; and
a ring-shaped cover member that covers at least a part of each of the coil end portions, that accommodates the radial coils, and that is attached to the stator,
wherein the cover member includes
an outer peripheral portion that surrounds outer peripheries of the coil end portions,
an inner peripheral portion that is surrounded by inner peripheries of the coil end portions, and
wall portions that extend along the radial coils in the radial direction and that protrude further than the radial coils in an axial direction, and
wherein a coil cooling channel is formed in the cover member, the coil cooling channel including
an upper-side outer peripheral channel through which a coolant that is supplied from an upper part of the outer peripheral portion flows along the outer peripheral portion by gravity,
a first radial channel through which the coolant flows from the upper-side outer peripheral channel along spaces between the wall portions and the radial coils by gravity,
an inner peripheral channel through which the coolant flows from the first radial channel along the inner peripheral portion by gravity,
a second radial channel through which the coolant flows from the inner peripheral channel along spaces between the wall portions and the radial coils by gravity, and
a lower-side outer peripheral channel through which the coolant is discharged from the second radial channel along the outer peripheral portion by gravity.

2. The rotating electric machine according to claim 1, wherein the coil cooling channel is formed at least on each of one side of the cover member facing the stator and the other side of the cover member facing away from the stator.

3. A rotating electric machine comprising:
a stator having slots extending along a rotational axis of the rotating electric machine;
slot coils provided in each of the slots, respectively and having coil end portions which are arranged in an annular shape viewed along the rotational axis;
radial coils each of which extends in a radial direction of the annular shape and each of which is connected to each of the coil end portions; and
a ring-shaped cover accommodating the radial coils and attached to the stator so as to cover at least a part of each of the coil end portions, the ring-shaped cover comprising:
an outer peripheral portion surrounding the coil end portions around the rotational axis;
an inner peripheral portion surrounded by the coil end portions around the rotational axis;

wall portions each of which extends along the radial coils and is provided between the outer peripheral portion and the inner peripheral portion viewed along the rotational axis;

an outer peripheral channel extending along the outer peripheral portion such that a coolant supplied into the ring-shaped cover is to flow through the outer peripheral channel by gravity;

an inner peripheral channel extending along the inner peripheral portion and surrounded by the outer peripheral channel viewed along the rotational axis such that the coolant is to flow through the inner peripheral channel by gravity;

radial channels each of which is defined between each of the wall portions and each of the radial coils and connects the outer peripheral channel to the inner peripheral channel, the radical channels comprising:

a first radial channel through which the coolant is to flow from the outer peripheral channel to the inner peripheral channel by gravity; and a second radial channel through which the coolant is to flow from the inner peripheral channel to the outer peripheral channel by gravity; and the outer peripheral channel through which the coolant is to flow from the second radical channel by gravity.

4. The rotating electric machine according to claim 3, wherein the wall portions project with respect to the radial coils viewed in the radical direction of the annular shape.

5. The rotating electric machine according to claim 3, wherein the ring-shaped cover includes a first side facing the stator and a second side opposite to the first side in an axial direction of the rotational axis, and the outer peripheral channel, the inner peripheral channel, the radial channels are provided at a first side and the second side.

\* \* \* \* \*